United States Patent

Jager

[15] 3,653,646

[45] Apr. 4, 1972

[54] FLAME SCARFING TORCH

[72] Inventor: Albert Jager, Rommelhausen, Germany

[73] Assignee: Messer Griesheim GmbH, Frankfurt am Main, Germany

[22] Filed: Nov. 12, 1969

[21] Appl. No.: 876,010

[30] Foreign Application Priority Data

Dec. 23, 1968 Germany..................G 68 12 833.6

[52] U.S. Cl...........................266/23 T, 239/132.3, 239/556
[51] Int. Cl.........................................................B23k 7/00
[58] Field of Search.................266/23 R, 23 H, 23 HH, 23 K, 266/23 L, 23 M, 23 P, 23 Q, 23 T; 239/451, 556, 557, 568, 132.3, 433, 432

[56] References Cited

UNITED STATES PATENTS 1,390,423  9/1921  Berg........................................239/556
2,484,123  10/1949  Scherl..................................239/132.3
3,351,284  11/1967  Hutton et al............................239/556
3,398,898  8/1968  Gutermann et al.....................239/556
3,446,441  5/1969  Henn et al. ............................239/556
2,483,479  10/1949  Smith et al............................266/23 P
2,838,431  6/1958  Allmang et al.......................266/23 H
3,411,466  11/1968  Pfeuffer...............................266/23 H

FOREIGN PATENTS OR APPLICATIONS 153,327  2/1956  Sweden...................................239/556

Primary Examiner—Gerald A. Dost
Attorney—Connolly and Hutz

[57] ABSTRACT

A flame scarfing nozzle for a flame scarfing torch includes a stratified plate between the nozzle halves to control the size of the flame scarfing slot.

7 Claims, 2 Drawing Figures

PATENTED APR 4 1972  3,653,646

FLAME SCARFING TORCH

BACKGROUND OF INVENTION

This invention relates to a flame scarfing nozzle of a flame scarfing torch for flame scarfing machines having an upper and a lower nozzle half with a slot situated therebetween.

It is known to arrange a number of flame scarfing nozzles side by side in order to achieve an uninterrupted penetrating flame scarfing slot. If, however, these individual flame scarfing slots of a torch assembly (consisting of several flame scarfing nozzles) have different dimensions, the surface quality of the flame scarfed material is varied. In practice the flame scarfing slots are subjected to considerable wear and the flame scarfing slot is enlarged by the wear. As a result, oxygen consumption is increased. Moreover, the surface qualities to be achieved are deteriorated. An adjustment of the flame scarfing slot by means of wedges, screws or the like is unsuitable, since under the existing rough operating requirements an exact adjustment of the flame scarfing slot cannot be achieved.

SUMMARY OF INVENTION

An object of this invention is to provide a flame scarfing nozzle which offers uniformly good surface qualities with long service life.

This object is fulfilled according to the invention in that between the upper and the lower nozzle half there is situated a stratified or laminated plate.

Due to the adjustability accorded by means of the stratified plate, all of the above disadvantages are avoided, while still other advantages are obtained. In this respect deviations from nominal size of the flame scarfing slot due to finishing inaccuracies can be equalized without refinishing by means of the stratified plate - by the removal of individual layers or by employing thicker stratified plate packs. The flame scarfing slots of flame scarfing nozzles located side by side can be compensated to each other. With a change of the dimensions of the flame scarfing slot due to wear, the stratified plates are removed in accordance to the requirements for each torch and the rated value of the individual torches, which comprise the torch assembly, is again restored. In operation, often only one nozzle half of a flame scarfing nozzle wears greatly. Until now the exchange of individual nozzle halves was impossible, since the dimension of the flame scarfing slot in the assembly of already partially worn nozzle halves with newly made nozzle halves could not be maintained. According to the invention, this is made possible by the insertion of corresponding stratified plates.

THE DRAWINGS

FIG. 1 shows a flame scarfing nozzle with a stratified plate situated between the nozzle halves; and FIG. 2 shows a stratified plate in accordance with this invention with borings for accommodating the holding screws.

DETAILED DESCRIPTION

Figure 1:
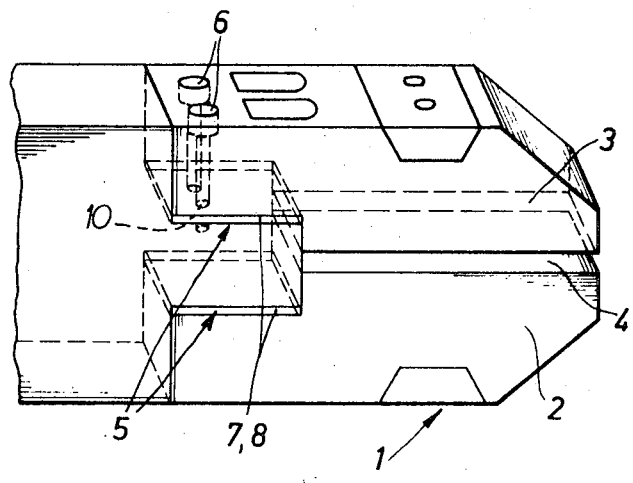

FIG. 1 illustrates a flame scarfing nozzle 1 consisting of a lower nozzle half 2 and an upper nozzle half 3. Between the nozzle halves is located the flame scarfing slot 4. A stratified or laminated plate 5, which serves for, the precise maintenance of the flame scarfing slot by spacing halves 2 and 3 from each other, is firmly connected with the nozzle halves by means of screws 6. By removal of the individual layers 7,8 of the stratified plate 5, the width of the flame scarfing slot is changed.

Figure 2:
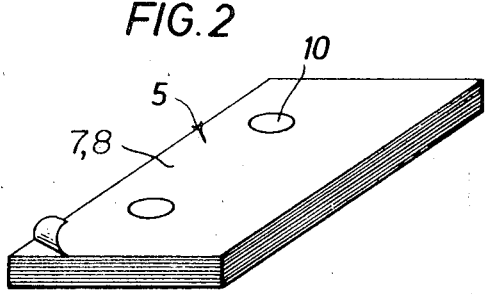

FIG. 2 shows a stratified plate 5, which is cut to size in its edge length to the dimensions of the flame scarfing nozzle 1, Holes 10 are bored into the stratified plate for receiving screws 6.

For the sake of clarity FIG. 1 illustrates only one nozzle 1. A plurality of such nozzles, each incorporating a stratified plate 5, can also be arranged side by side in accordance with this invention. By this side by side arrangement the spacing of nozzle halves in individual nozzles can be adjusted by removing the required number of layers from the individual nozzles to maintain uniform slot dimensions for the assembly. The invention may also be practiced by adding layers, as well as removing them.

What is claimed is:

1. A flame scarfing nozzle in a flame scarfing torch comprising a body, an upper nozzle part and a lower nozzle part, said body including a projection on which the upper and lower nozzle parts being attached to create a flame scarfing slot therebetween, and a stratified plate consisting of individual removable layers being arranged between said projection and at least one of said nozzle parts.

2. A nozzle as set forth in claim 1, in combination therewith, a plurality of said nozzles being arranged side by side with the individual slots being in communication to create a single resultant slot, and said resultant slot being of uniform thickness.

3. The combination of claim 2 wherein the stratified plate in one of said nozzles contains a different number of layers than the stratified plate in another of said nozzles.

4. A nozzle as set forth in claim 1 wherein said stratified plate is juxtaposed said upper nozzle part, and a second stratified plate being under the first stratified plate and juxtaposed said lower nozzle part.

5. A nozzle as set forth in claim 1, in combination therewith, a plurality of said nozzles being arranged side by side, each nozzle having its individual slot and said individual slots each containing a different number of layers of said stratified plate to create a single resultant combined slot of uniform thickness throughout said nozzles.

6. A nozzle as set forth in claim 1 wherein the total thickness of all of said stratified plates is less than the thickness of said slot.

7. A nozzle as set forth in claim 6 wherein each nozzle part includes a discharge end and a mounting end remote therefrom, the discharge ends of both nozzle parts being spaced from each other and an open non-tortuous path being formed therebetween to comprise said scarfing slot, each mounting end of each nozzle part being recessed to receive said projection, each stratified plate being disposed between its recess and said projection.

* * * * *